United States Patent
Watson et al.

(10) Patent No.: US 7,437,721 B2
(45) Date of Patent: Oct. 14, 2008

(54) ISOLATING SOFTWARE DEPLOYMENT OVER A NETWORK FROM EXTERNAL MALICIOUS INTRUSION

(75) Inventors: Colin Watson, Issaquah, WA (US); Martin L. Holladay, Bremerton, WA (US); Mukesh Karki, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 10/953,020

(22) Filed: Sep. 29, 2004

(65) Prior Publication Data

US 2006/0070056 A1 Mar. 30, 2006

(51) Int. Cl.
*G06F 9/44* (2006.01)
(52) U.S. Cl. .................. 717/168; 709/220; 713/156; 717/178; 726/1
(58) Field of Classification Search .............. None
See application file for complete search history.

(56) References Cited

U.S. PATENT DOCUMENTS

| | | | |
|---|---|---|---|
| 6,854,112 B2 * | 2/2005 | Crespo et al. .............. 717/174 |
| 7,290,258 B2 * | 10/2007 | Steeb et al. ................ 717/178 |
| 7,350,072 B2 * | 3/2008 | Zimmer et al. ............. 713/156 |
| 7,350,201 B2 * | 3/2008 | Ferri et al. ................. 717/168 |
| 2005/0091348 A1 * | 4/2005 | Ferri et al. ................. 709/220 |
| 2005/0273841 A1 * | 12/2005 | Freund ........................ 726/1 |

OTHER PUBLICATIONS

Brown et al: "Cisco Cookbook, Field-tested solutions to Cisco Router Problems" 'Online! Apr. 5, 2004. 'retrieved on Feb. 20, 2006.
Microsoft Corporation: "Chapter 1: Choosing an Automated Installation Method" Microsoft Publication, Apr. 14, 2004.
Microsoft Corporation: "Using Windows XP Professional with Service Pack 2 in a Managed Environment: controlling communication with the Internet" Microsoft Publication, Jul. 2004, pp. 161-181.
European Search Report dated Mar. 14, 2006 regarding Application No. EP05108251.9.

\* cited by examiner

*Primary Examiner*—Wei Y. Zhen
*Assistant Examiner*—Phillip H Nguyen
(74) *Attorney, Agent, or Firm*—Lee & Hayes, PLLC

(57) ABSTRACT

Described herein is an implementation for secure deployment, over a network, of software (e.g., an operating system) and updates to a bare computer (e.g., a server), so that it is not susceptible to malicious network-based intrusion.

27 Claims, 5 Drawing Sheets

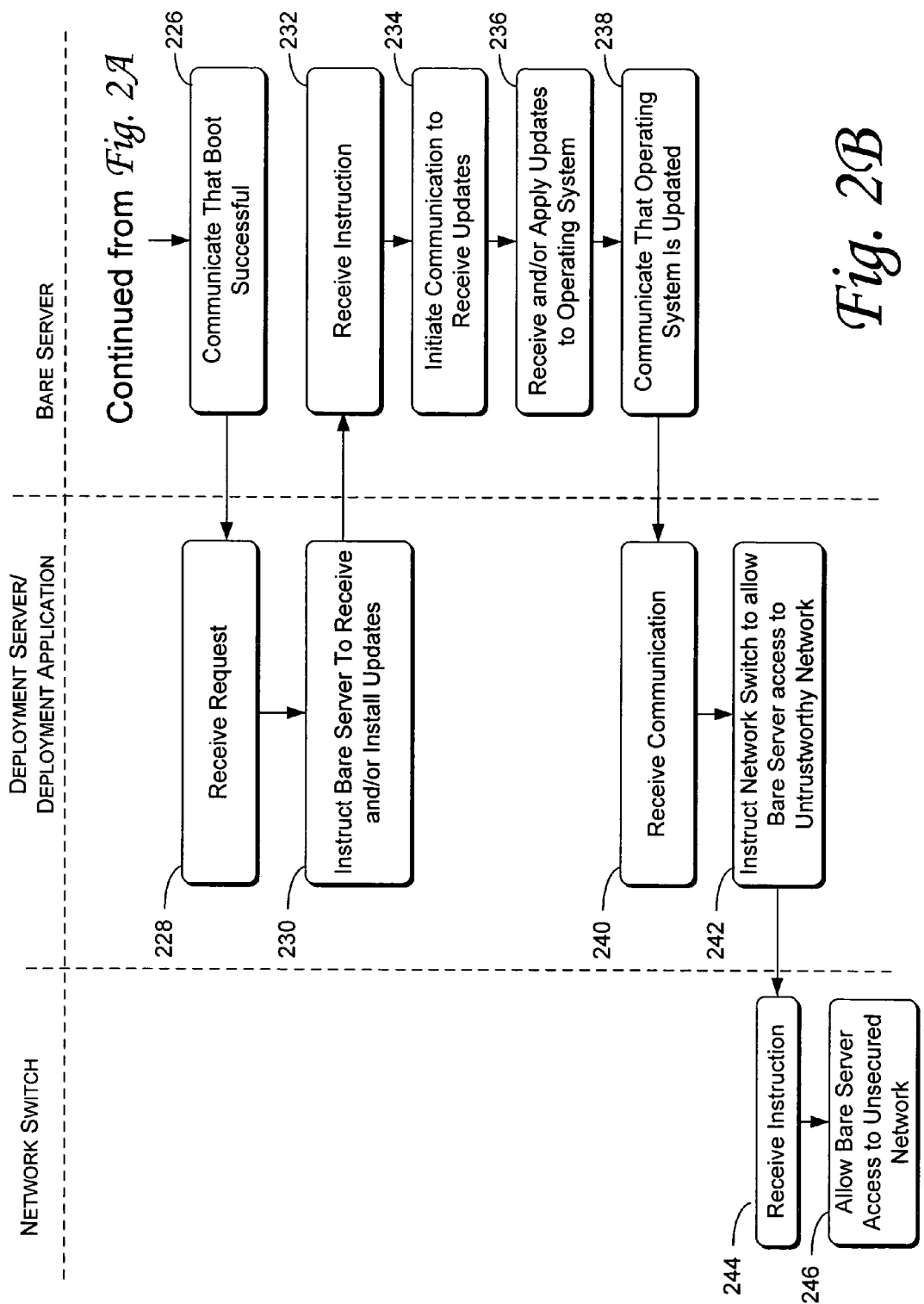

ISOLATING SOFTWARE DEPLOYMENT OVER A NETWORK FROM EXTERNAL MALICIOUS INTRUSION

TECHNICAL FIELD

This invention generally relates to operating systems and other software of computers on a network.

BACKGROUND

One of the quickest and easiest ways to add a new "bare server"—which is a server not having an operating system—to a network is to plug it into the network and use a deployment server to deploy a disk "image" or setup files of an operating system to the bare server. The bare server saves this image to its hard disk drive or equivalent storage and then reboots. Once it reboots, it will be running with the newly deployed operating system.

Patches to operating systems are deployed frequently and therefore the operating system image goes out-of-date, or stale, very quickly. Regenerating new images or setup files to deploy to bare servers so that they contain the latest patches when they are first booted is time consuming.

Therefore, it is desirable for the newly deployed servers with an otherwise "stale" operating system to be updated immediately upon first post-deployment reboot. After the first post-deployment reboot, it typically acquires the necessary updates via the network, usually from a public network (such as the Internet) or from an intranet server.

However, the network (especially an untrustworthy network such as the Internet) may be susceptible to malicious intrusion, such as a virus, Trojan horse, or other network-based attack. It is not uncommon for a newly deployed "stale" server to be "attacked" by malicious code (like a virus or Trojan horse) via the network before it is able to acquire the necessary updates that would protect it from such attacks.

This is a real possibility, as many malicious programs take less than a second to corrupt a server running an out-of-date operating system. The MS Blaster virus, for instance, can corrupt a stale and unprotected server within tenths of a second.

To partially combat this problem, a bare server can be connected to a deployment server, such as by manually plugging a cable into both servers, or by way of using a dedicated network switch, without being connected to a production or "live" network. Through this cable or dedicated switch, the deployment server can deploy an operating system image to the bare server. The server can then be rebooted with the operating system. Once this is done, updates can be installed, usually by hand with compact disks, to make the operating system, applications and system services optimally secure. Once updated, the server can then be plugged into the network.

While this partial solution may reduce the server's vulnerability to attack, it is time consuming and error prone. An information technology specialist can spend many hours connecting bare servers directly to a deployment server, deploying images, installing updates, disconnecting the servers from the deployment server, and then connecting them to the production or live network. In some ways, this defeats the purpose of automatic software deployment.

Also, to partially combat this problem, the operating system and updates can be manually installed on a bare server, usually with many compact disks, prior to connecting the server to the network. Manually installing an operating system and updates, however, is also time consuming and tedious; it can takes hours for each server. This, too, defeats the purpose of automatic software deployment.

There is, therefore, a need for a secure way to deploy, over a network, an operating system and updates to a bare server, so that it is not susceptible to malicious network-based intrusion.

SUMMARY

Described herein is an implementation for secure deployment, over a network, of software product (e.g., an operating system, an application program, and a software service) and updates to a bare computer (e.g., a server), so that it is not susceptible to malicious network-based intrusion.

BRIEF DESCRIPTION OF THE DRAWINGS

The same numbers are used throughout the drawings to reference like elements and features.

FIGS. 2A and 2B show a flow diagram showing a methodological implementation described herein.

DETAILED DESCRIPTION

The following description sets forth techniques for secure deployment, over a network, of an operating system and updates to a bare server so that it is not susceptible to malicious network-based intrusion. The techniques may be implemented in many ways, including (but not limited to) program modules, general- and special-purpose computing systems, network servers and equipment, dedicated electronics and hardware, and as part of one or more computer networks.

An exemplary implementation of these techniques may be referred to as an exemplary isolator of vulnerable and newly deployed software or simply as an "exemplary isolator."

Exemplary Operational Environment

Via an automated software deployment service, datacenters have the ability to rapidly deploy software (e.g., operating systems) based on transferring reference "images" across a network. Rapid system deployments are a huge benefit to datacenter operators; however, rapidly deploying a new server only to have it immediately attacked is a serious shortcoming.

Figure 1:
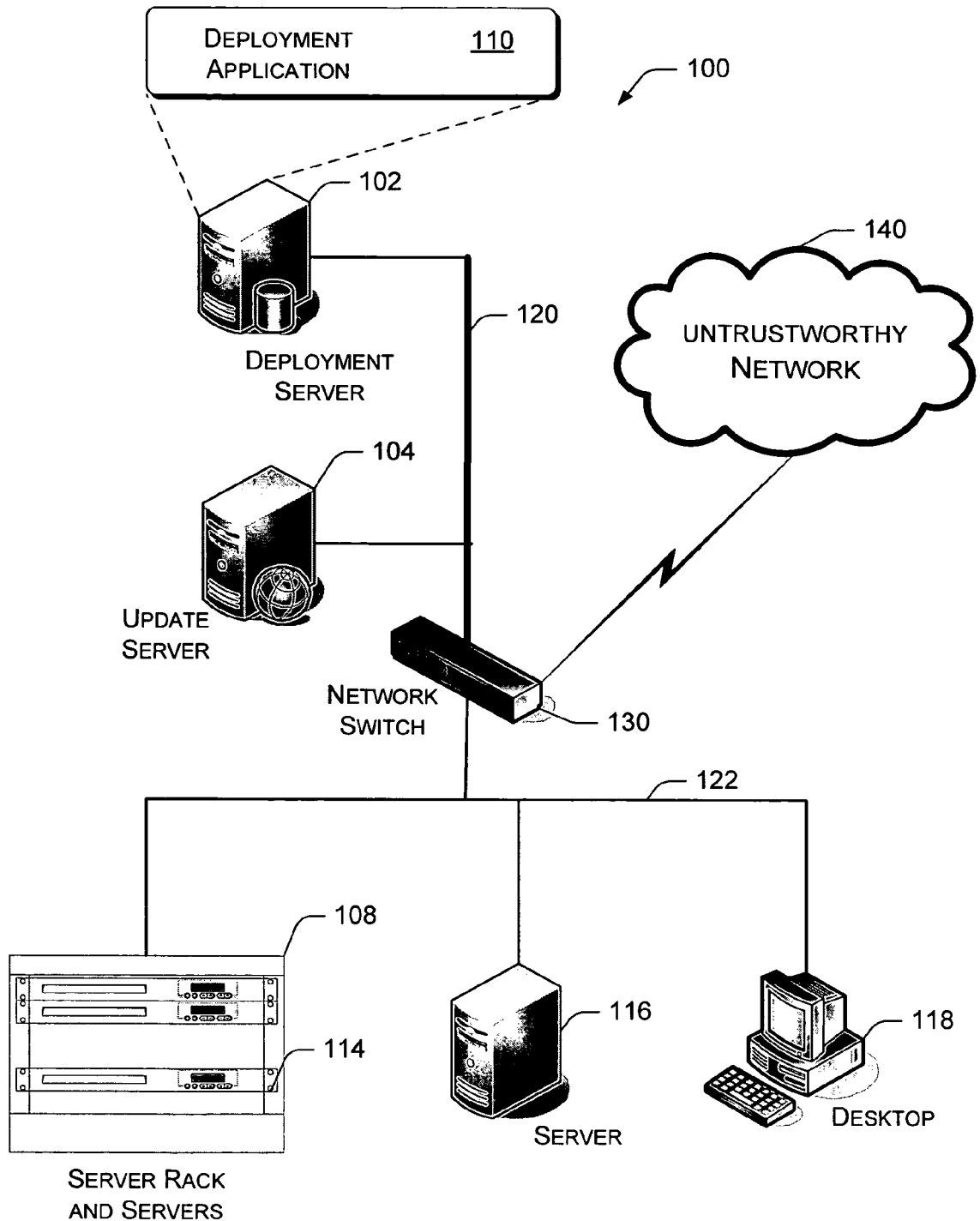
FIG. 1 is an exemplary operating environment for an implementation described herein. The exemplary operating environment is shown having exemplary servers, a network susceptible to malicious intrusion, and bare computers.

FIG. 1 discloses an operational environment 100 (or "architecture") in which software is automatically deployed. This is also an exemplary operational environment in which the exemplary isolator may operate.

This exemplary operational environment 100 is shown having several components coupled across a central and secure network 120. Those network-coupled components include a deployment server 102, an update server 104, and a network switch 130. This operational environment 100 is also shown having several components coupled across a switchable and possibly secure network 122, and those components are a rack-mounted bare server 114 (one or several servers mounted in a rack 108), a bare server 116, and a bare desktop computer 118. Furthermore, the environment is also shown with an untrustworthy network 140 (e.g., the Internet) being switchably coupled to the two other networks (120 and 122) via the network switch 130.

The deployment server 102 performs the act of software deployment. The deployment server 102 comprises computer-readable media capable of performing one or more of the processes described below. These media can comprise a deployment application 110, for instance.

As illustrated in FIG. 1, the exemplary isolator is implemented by the deployment application 110 of the deployment server 102. It is also implemented, at least in part, by the network switch 130.

The update server 104 also comprises computer-readable media, here capable of deploying software patches, fixes, and the like, such as to update an out-of-date operating system for improving its operation, e.g., its security capabilities. These updates can improve resistance to various malicious code later received by the bare server, described in greater detail below.

Three exemplary bare computers are also shown, the bare server 114 in rack 108, the bare stand-alone server 116, and the bare desktop 118. Each of the bare computers has a software or hardware application sufficient to enable the bare computer to request, receive, and follow basic instructions, such as from the deployment application 110.

The operational environment 100 communicates across the network 120 and 122. These networks are communication networks that are susceptible to malicious communication, such as network-based attacks. In particular, such a malicious communication may come from the untrustworthy network 140 (such as the Internet or an intranet with a corrupted computer, which is capable of sending malicious code across the network).

These networks 120, 122, and 140 are switchably coupled together via the network switch 130. This switch is capable of receiving instructions from a server (such as the deployment server 102) to select which networks (and indeed which devices on those networks) may communicate with each other.

For example, the network switch 130 may be directed to isolate network 122 from the untrustworthy network 140. In that way, the devices on network 122 may communicate with devices on network 120, but cannot communicate with devices on the untrustworthy network 140 and vice versa.

Methodological Implementation

Figure 2A:
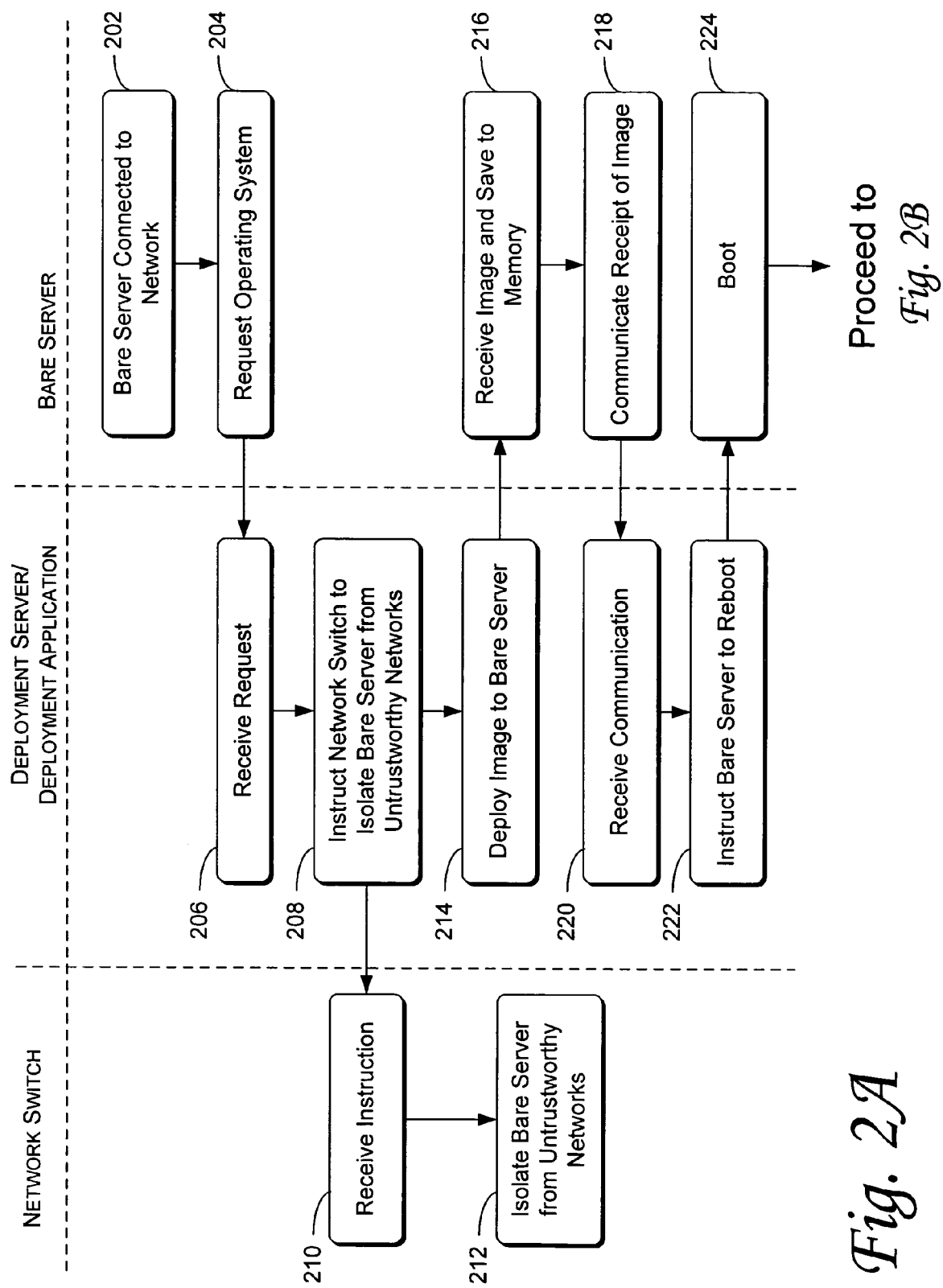

FIGS. 2A and 2B show a methodological implementation of the exemplary isolator of vulnerable and newly deployed software. This methodological implementation may be performed in software, hardware, or a combination thereof. For ease of understanding, the method steps are delineated as separate steps; however, these separately delineated steps should not be construed as necessarily order dependent in their performance.

The method of FIGS. 2A and 2B is illustrated as a series of blocks representing individual operations or acts performed by the deployment server 102 (such as with deploying application 110), the network switch 130, and a bare server (e.g., server 116).

Those exemplary operations and acts performed by the deployment server 102—to effectively isolate the newly deployed bare server while it is left unprotected before and during its update—are illustrated under the heading "Deployment Server/Deployment Application."

Those exemplary operations and acts performed by a bare server (e.g., server 116)—for securely receiving the deployed image and updating the operating system—are illustrated under the heading "Bare Server."

Those exemplary operations and acts performed by the network switch 130—to selectively isolate (in response to instructions to do so) the newly deployed bare server while it is left unprotected before and during its update—are illustrated under the heading "Network Switch."

At 202 of FIG. 2A, a bare computer is connected to network 122. For example, bare server 114 is plugged into the network via rack 108, though other bare computers, such as stand-alone server 116 or desktop 118, can instead be connected to the network.

At 204, the bare server communicates across the networks (e.g., network 122 and 120 via switch 130), requesting an operating system. Without an operating system, the bare server typically is not yet vulnerable to malicious code on the network. Instead of requesting an operating system, it may request any other software product (e.g., an application program or a software service).

At 206, the deployment server 102 receives the request for a software product, such as an operating system. At 208, the deployment server 102 sends instructions to the network switch that effectively isolate the bare server from insecure networks (such as untrustworthy network 140).

At 210 of FIG. 2A, the network switch 140 receives the instruction and, at 212, it effectively isolates the bare server from insecure networks (such as untrustworthy network 140).

There are numerous ways that the switch may accomplish this. One brute force method is to shut off all incoming traffic from the untrustworthy network 140. Another approach would be to prevent communications between network 122 and the untrustworthy network 140. A more sophisticated approach involves monitoring of traffic through the switch and preventing traffic to/from the untrustworthy network 140 from/to the bare server that is being deployed.

Over a trustworthy network, the newly deployed bare server may communicate with the deployment server, the update server and possibly other network infrastructure services, such as Dynamic Host Configuration Protocol (DHCP) and Domain Name System (DNS) servers At 214, the deployment server, through deployment application 110, securely deploys a software product image (e.g., an operating system image) to the bare server.

At 216 of FIG. 2A, the bare server securely receives the image via the network and saves it to memory. At 218, the bare server communicates that it has received the image. At 220, the deployment server receives the communication from the bare server, indicating that it has received the image. At 222, the deployment server, through the deployment application, instructs the bare server to boot the image.

At 224 of FIG. 2A, the bare server reboots, thereby running the image with the operating system and its configuration settings. The bare server—now no longer bare, as it has an operating system—is running and operational after the boot process is over.

Except for the network switch 130 effectively isolating it from untrustworthy networks, the bare server, with an out-of-date operating system would be vulnerable to malicious interference and communication sent over the network. Nothing in the bare server protects it from a malicious attack. Instead, actions of external components (namely, the deployment server and the switch) have isolated it while it is still vulnerable.

This method now continues on FIG. 2B.

At 226 of FIG. 2B, bare server 114 informs the deployment server that the operating system is running and/or that the boot was successful.

At 228, deployment server 102 receives this information. At 230, the deployment server, through deployment application 110, instructs the bare server to receive and/or install updates.

In one embodiment, the deployment server instructs the bare server to initiate communication with the update server 104. In another embodiment, the deployment server sends updates to the bare server's operating system and instructs it to add these updates.

At 232 of FIG. 2B, the bare server receives the instruction to receive updates. At 234, the bare server initiates communication to receive updates. For example, the bare server solicits communication from update server 104.

At 236, the bare server receives and applies updates to its operating system. These updates can be received via the network from the update server solicited at block 234 or from the deployment server directly, for instance.

At 238 of FIG. 2B, the bare server communicates that it has updated its operating system. At 240, the deployment server receives this communication.

At 242, the deployment server instructs the network switch to discontinue the isolation of the bare server. In other words, the bare server—since it is fully updated and presumably no longer vulnerable to malicious attacks—should be allowed free reign across an unsecured network, such as the Internet.

At 244 of FIG. 2B, the network switch 140 receives the instruction. At 246, the switch removes the bare server from its isolation. The switch now allows for traffic between the bare server and insecure networks (such as untrustworthy network 140).

Herein, most, if not all, of the acts of the deployment server, the deployment application, and the network switch can be performed automatically and without user interaction.

This enables a user to connect a bare server or other bare computer to a network and, without further interaction, have the bare server operate with an updated operating system, without having to subject the bare server to malicious code via the network before the operating system is updated.

Alternative Operational Environment

Figure 3:
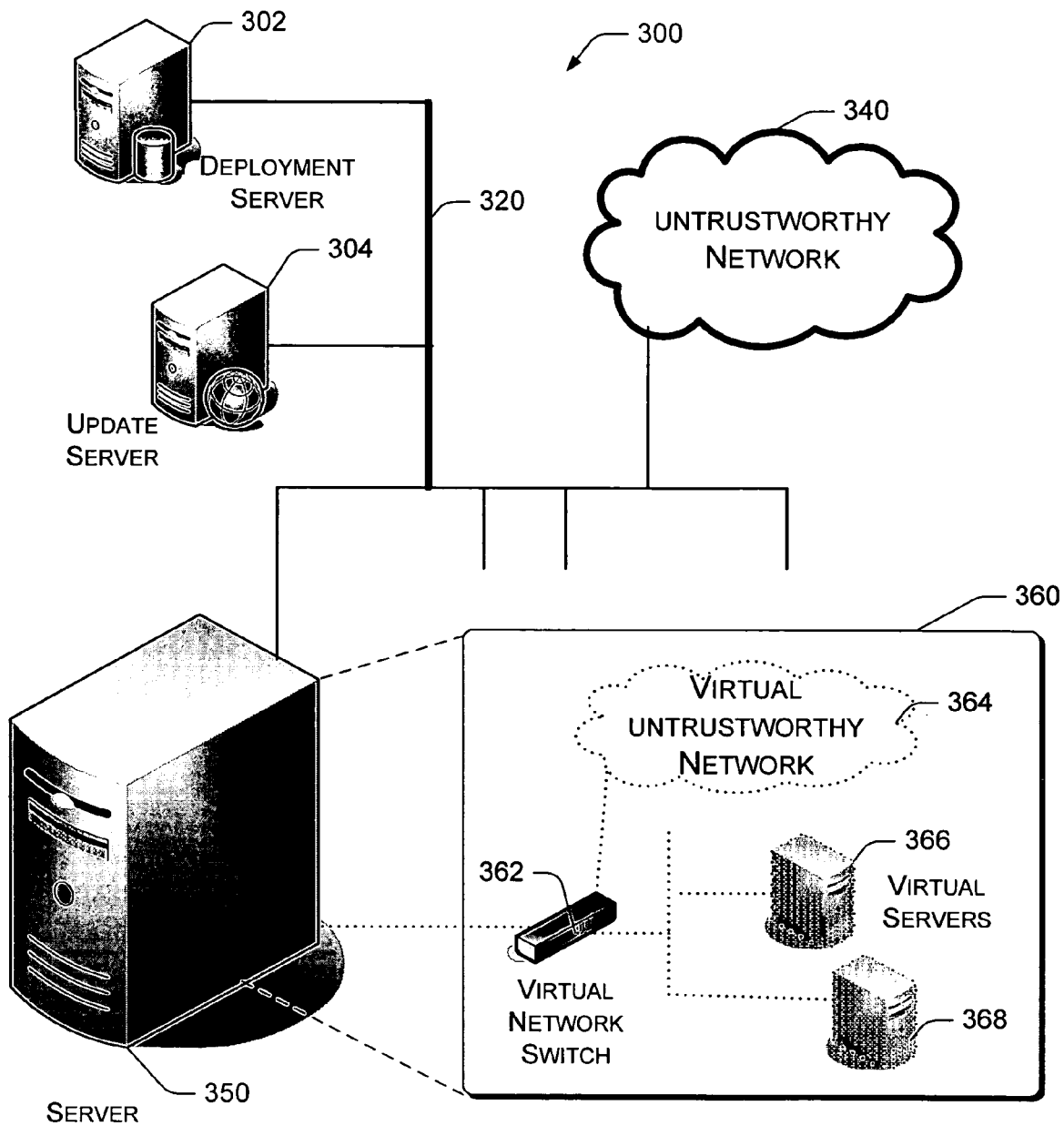
FIG. 3 is a block diagram of an alternative exemplary operating environment for an implementation described herein.

FIG. 3 discloses another exemplary operational environment 300 (or "architecture") in which the exemplary isolator may operate. This operational environment 300 is shown having several components coupled across a network 320.

Those network-coupled components include a deployment server 302 and an update server 304. Also attached to the network 320 is an untrustworthy network 140 (e.g., the Internet). Also, there may be many other network-coupled devices which are not shown.

A "virtual server" 350 is another component illustrated in FIG. 3 as coupled to the network 320. The virtual server is a server hosting one or more instances of virtual machines. This virtual server is home to a virtual local area network ("virtual LAN") 360. This virtual LAN does not exist physically, but, rather, it is simulated by the virtual server 350. For the sake of clarity, the actual physical network 320 is called herein the "external" network, and the virtual LAN 360 is called, herein, the "internal" network.

Alternatively, the deployment server 302 and the update server 304 may be virtual machines within the virtual server 350 and part of a virtual trusted network within the internal network 360.

This internal network 360 has a virtual network switch 462 (which is a simulated version of the switch 130 shown in FIG. 1) and multiple virtual machines (e.g., 366 and 368). Furthermore, internal network 360 is also shown with a virtual untrustworthy network 364 virtually, switchably coupled to the rest of the internal network 360.

The virtual untrustworthy network 364 is illustrated in FIG. 3 as being within the context of the internal network 360 for the purpose of showing that the virtual switch 362 is capable of virtual switching on/off the access to the virtual untrustworthy network 364. However, the virtual untrustworthy network 364, illustrated in FIG. 3, is merely a representation of the actual untrustworthy network 340. The switch can virtually switch (or filter) access to/from the actual untrustworthy network 340.

In this alternative embodiment, the target bare server is a virtual server (such as server 368). The operations and action described above in the context of one physical network and physical bare server is directly analogous to the operation within the context of the internal network 360 in the embodiment shown in FIG. 3.

Exemplary Computing System and Environment

Figure 4:
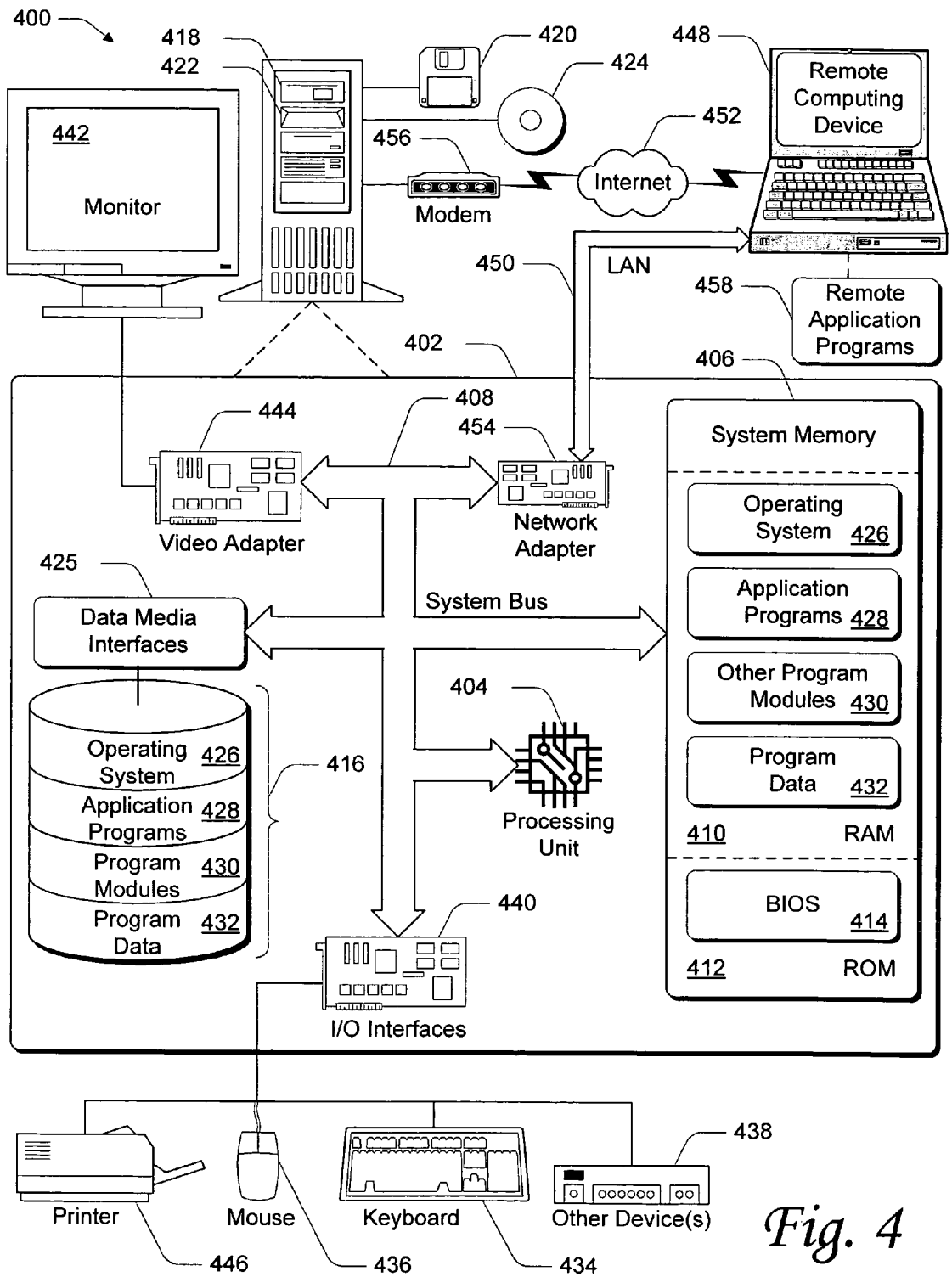
FIG. 4 is an example of a computing operating environment capable of (wholly or partially) implementing at least one embodiment described herein.

FIG. 4 illustrates an example of a suitable computing environment 400 within which an exemplary isolator, as described herein, may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The exemplary isolator may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, personal digital assistants (PDA), appliances, special-purpose electronics (e.g., a DVD player), programmable consumer electronics, network PCs, minicomputers, mainframe computers, distributed computing environments that include any of the above systems or devices, and the like.

The exemplary isolator may be described in the general context of processor-executable instructions, such as program modules, being executed by a computer. Generally, program modules include routines, programs, objects, components, data structures, etc. that perform particular tasks or implement particular abstract data types. The exemplary isolator may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 may include, but are not limited to, one or more processors or processing units 404, a system memory 406, and a system bus 408 that couples various system components, including the processor 404, to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus, also known as a Mezzanine bus.

Computer 402 typically includes a variety of processor-readable media. Such media may be any available media that is accessible by computer 402 and includes both volatile and non-volatile media, removable and non-removable media.

The system memory 406 includes processor-readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 may be connected to the system bus 408 by one or more interfaces (not shown).

The disk drives and their associated processor-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 416 magnetic disk 420, optical disk 424, ROM 412, and/or RAM 410, including, by way of example, an operating system 426, one or more application programs 428, other program modules 430, and program data 432.

A user may enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device may also be connected to the system bus 408 via an interface, such as a video adapter 444. In addition to the monitor 442, other output peripheral devices may include components, such as speakers (not shown) and a printer 446, which may be connected to computer 402 via the input/output interfaces 440.

Computer 402 may operate in a networked environment using logical connections to one or more remote computers, such as a remote computing device 448. By way of example, the remote computing device 448 may be a personal computer, a portable computer, a server, a router, a network computer, a peer device or other common network node, the deployment server 102, the update server 104, and the like. The remote computing device 448 is illustrated as a portable computer that may include many or all of the elements and features described herein, relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. Such networking environments may be wired or wireless.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which may be internal or external to computer 402, may be connected to the system bus 408 via the input/output interfaces 440 or other appropriate mechanisms. It is to be appreciated that the illustrated network connections are exemplary and that other means of establishing communication link(s) between the computers 402 and 448 may be employed.

In a networked environment, such as that illustrated with computing environment 400, program modules depicted, relative to the computer 402 or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computing device 402 and are executed by the data processor(s) of the computer.

Processor-Executable Instructions

An implementation of an exemplary isolator may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 400 in which an exemplary isolator may be implemented. Specifically, the exemplary isolator(s), described herein, may be implemented (wholly or in part) by any program modules 428-430 and/or operating system 426 in FIG. 4 or a portion thereof.

The operating environment is only an example of a suitable operating environment and is not intended to suggest any limitation as to the scope or use of functionality of the exemplary isolator(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipment, general and special-purpose appliances, application-specific integrated circuits (ASICs), network PCs, minicomputers, mainframe computers, distributed computing environments that include any of the above systems or devices, and the like.

Processor-Readable Media

An implementation of an exemplary isolator may be stored on or transmitted across some form of processor-readable media. Processor-readable media may be any available media that may be accessed by a computer. By way of example, processor-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

CONCLUSION

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more computer-storage media having processor-executable instructions that, when executed by a processor, perform acts comprising:
   connecting a bare computer to one or more networks, wherein the bare computer is a computer not having an operating system;
   requesting an initial operating system upon connecting the bare computer to the one or more networks;
   in response to the bare computer requesting the initial operating system, receiving instructions at a network switch directly from a deployment server connected to the one or more networks;
   in response to the receiving instructions at the network switch, isolating the bare computer on the one or more networks from an untrustworthy network, wherein:
      the untrustworthy network is capable of communicating a malicious intrusion to the bare computer when the bare computer is not isolated from the untrustworthy network;
   enabling the bare computer to receive the initial operating system via the one or more networks;
   enabling the bare computer to reboot, thereby running the initial operating system;
   enabling the bare computer to receive, while still isolated, an update to a software product via the one or more networks, wherein the software product is at least part of the initial operating system;
   enabling the bare computer to apply, while still isolated, the update to the software product; and
   instructing the network switch to discontinue the isolation of the bare computer.

2. One or more computer-storage media as recited in claim 1 further comprising removing the isolation, after the bare computer has received the update, so that the bare computer is capable of communicating via the untrustworthy network.

3. One or more computer-storage media as recited in claim 1, wherein the bare computer comprises a bare server.

4. One or more computer-storage media as recited in claim 1, wherein the bare computer comprises a virtual bare computer and the one or more networks are, at least in part, a virtual network.

5. One or more computer-storage media as recited in claim 1, wherein the isolating is performed by a physical network switch.

6. One or more computer-storage media as recited in claim 1, wherein the isolating is performed by a virtual network switch and the one or more networks are, at least in part, a virtual network.

7. One or more computer-storage media as recited in claim 1, wherein the untrustworthy network comprises one or more untrustworthy network-coupled devices.

8. One or more computer-storage media as recited in claim 1, wherein the software product is received as an image.

9. One or more computer-storage media as recited in claim 1, wherein the acts of isolating and enabling are performed without user interaction.

10. A computer comprising one or more computer-storage media as recited in claim 1.

11. A method comprising:
   a bare computer connecting to one or more networks, wherein:
      the bare computer is a computer not having an operating system; and
      the one or more networks comprise at least an untrustworthy network;
   upon connecting to the one or more networks the bare computer requesting an initial operating system;
   in response to the bare computer requesting an initial operating system, receiving instructions at a network switch directly from a deployment server connected to the one or more networks;
   in response to receiving the instructions at the network switch, enabling the network switch to isolate the bare computer on the one or more networks from the untrustworthy network, wherein the untrustworthy network is capable of communicating a malicious intrusion to the bare computer when the bare computer is not isolated from the untrustworthy network;
   enabling the bare computer to receive a software product via the one or more networks, wherein the software product is at least part of the initial operating system;
   enabling the bare computer to reboot, thereby running the software product;
   enabling the bare computer to receive, while still isolated, an update to the software product via the one or more networks;
   enabling the bare computer to apply, while still isolated, the update to the software product; and instructing the network switch to discontinue the isolation of the bare computer.

12. A method as recited in claim 11 further comprising removing the isolation, after the bare computer has received the update, so that the bare computer is capable of communicating via the untrustworthy network.

13. A method as recited in claim 11, wherein the bare computer comprises a bare server.

14. A method as recited in claim 11, wherein the bare computer comprises a virtual bare computer and the one or more networks are, at least in part, a virtual network.

15. A method as recited in claim 11, wherein the untrustworthy network comprises one or more untrustworthy network-coupled devices.

16. A method as recited in claim 11, wherein the software product is received as an image.

17. A method as recited in claim 11, wherein the acts of isolating and enabling are performed without user interaction.

18. One or more computer-readable media storing executable instructions for performing the method recited in claim 11.

19. A system comprising means for performing the method recited in claim 11.

20. A system comprising:
   a deployment means for deploying an initial operating system via a network to a bare computer, wherein the bare computer is a computer not having an operating system;
   an updating means for sending, after a deployment, an update to a software product of the bare computer via the network, wherein the software product is at least part of the initial operating system;
   an isolation means for isolating the bare computer from an untrustworthy network while the updating means is sending the update, wherein the untrustworthy network is capable of communicating a malicious intrusion to the bare computer when the bare computer is not isolated from the untrustworthy network, wherein the isolation means isolates the bare computer in response to receiving instructions directly from the deployment means;
   a receiving means for enabling the bare computer to receive the software product and the update to the software product;
   a rebooting means for rebooting the bare computer, thereby running the software product;
   an applying means for enabling the bare computer to apply, while still isolated, an update to the software product; and
   an instructing means for instructing the isolation means to discontinue the isolation of the bare computer.

21. A system as recited in claim 20, further comprising an un-isolation means for removing the isolation, after the bare computer has received the update, so that the bare computer is capable of communicating via the untrustworthy network.

22. A system as recited in claim 20, wherein the bare computer comprises a bare server.

23. A system as recited in claim 20, wherein the bare computer comprises a virtual bare computer and the network is, at least in part, a virtual network.

24. A system as recited in claim 20, wherein the untrustworthy network comprises one or more untrustworthy network-coupled devices.

25. A system as recited in claim 20, wherein the software product is deployed as an image.

26. A method as recited in claim 11, wherein the software product is selected from a group consisting of an operating system, an application program, or a software service.

27. A system as recited in claim 20, wherein the software product is selected from a group consisting of an operating system, an application program, or a software service.

* * * * *